(12) United States Patent
Leutard et al.

(10) Patent No.: US 10,618,665 B2
(45) Date of Patent: Apr. 14, 2020

(54) TURBOMACHINE CASING COMPRISING AN ENDOSCOPY PORT

(71) Applicant: SNECMA, Paris (FR)

(72) Inventors: Florence Irene Noelle Leutard, Moissy-Cramayel (FR); Didier Noel Durand, Moissy-Cramayel (FR); Thibault Jamon, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 1171 days.

(21) Appl. No.: 14/893,919

(22) PCT Filed: May 28, 2014

(86) PCT No.: PCT/FR2014/051284
§ 371 (c)(1),
(2) Date: Mar. 17, 2016

(87) PCT Pub. No.: WO2014/191699
PCT Pub. Date: Dec. 4, 2014

(65) Prior Publication Data
US 2016/0194088 A1 Jul. 7, 2016

(30) Foreign Application Priority Data

May 31, 2013 (FR) ..................... 13 54997

(51) Int. Cl.
*F01D 21/00* (2006.01)
*B64D 29/08* (2006.01)
*B64F 5/60* (2017.01)

(52) U.S. Cl.
CPC ............... *B64D 29/08* (2013.01); *B64F 5/60* (2017.01); *F01D 21/003* (2013.01); *F05D 2260/31* (2013.01); *F05D 2260/80* (2013.01)

(58) Field of Classification Search
CPC ............... F01D 21/003; F05D 2260/31; F05D 2260/80; F05D 2260/83; B64D 29/08; B64D 43/00; B64F 5/00; B64F 5/60
See application file for complete search history.

(56) References Cited

U.S. PATENT DOCUMENTS 5,076,910 A * 12/1991 Rush .................. C10G 7/06
208/100
5,867,976 A    2/1999 Ziegler, Jr.
8,573,078 B2 * 11/2013 Sue .................... F01D 17/02
73/865.8

FOREIGN PATENT DOCUMENTS

EP    2 407 643 A1    1/2012
FR    2 708 072        1/1995
GB    2 236 812 A     4/1991

* cited by examiner

*Primary Examiner* — Dwayne J White
*Assistant Examiner* — Danielle M. Christensen
(74) *Attorney, Agent, or Firm* — Womble Bond Dickinson (US) LLP

(57) ABSTRACT

A turbomachine casing (10) comprising an endoscopy port (12) and a member (14) mounted on and fixed to the casing and comprising a duct (16) that communicates with the port and that comprises an internal thread into which a cap (28) can be screwed, and means (22, 26) for fixing the member to the casing, characterised in that it further comprises a cover (30) mounted on the member and at least partially covering the fixing means in order to hinder, or indeed prevent, access to same when the cover is mounted on the member, the cover being arranged to allow free access to the duct when the cap is not screwed into the duct.

14 Claims, 4 Drawing Sheets

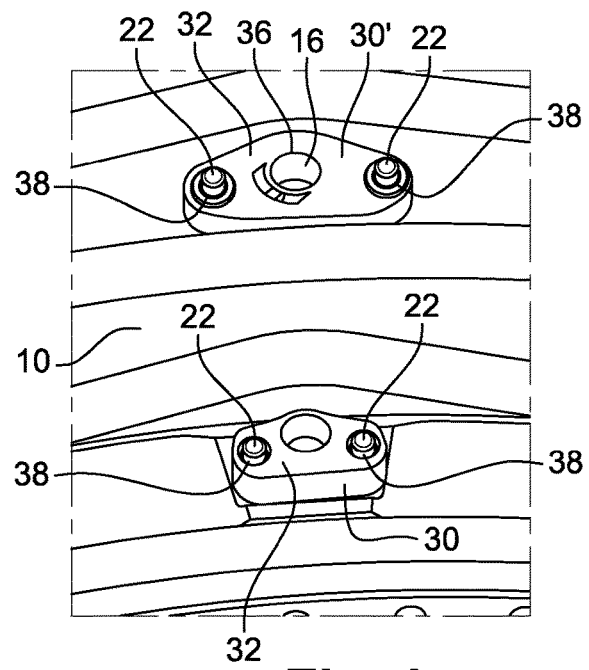
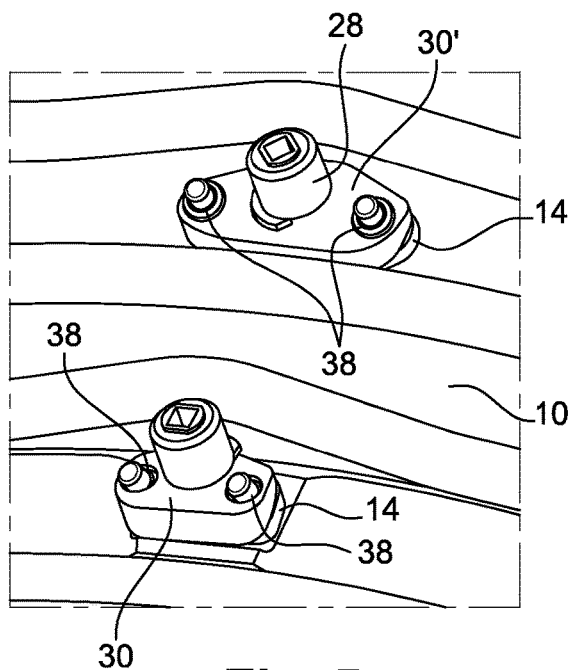
Fig. 4  Fig. 5
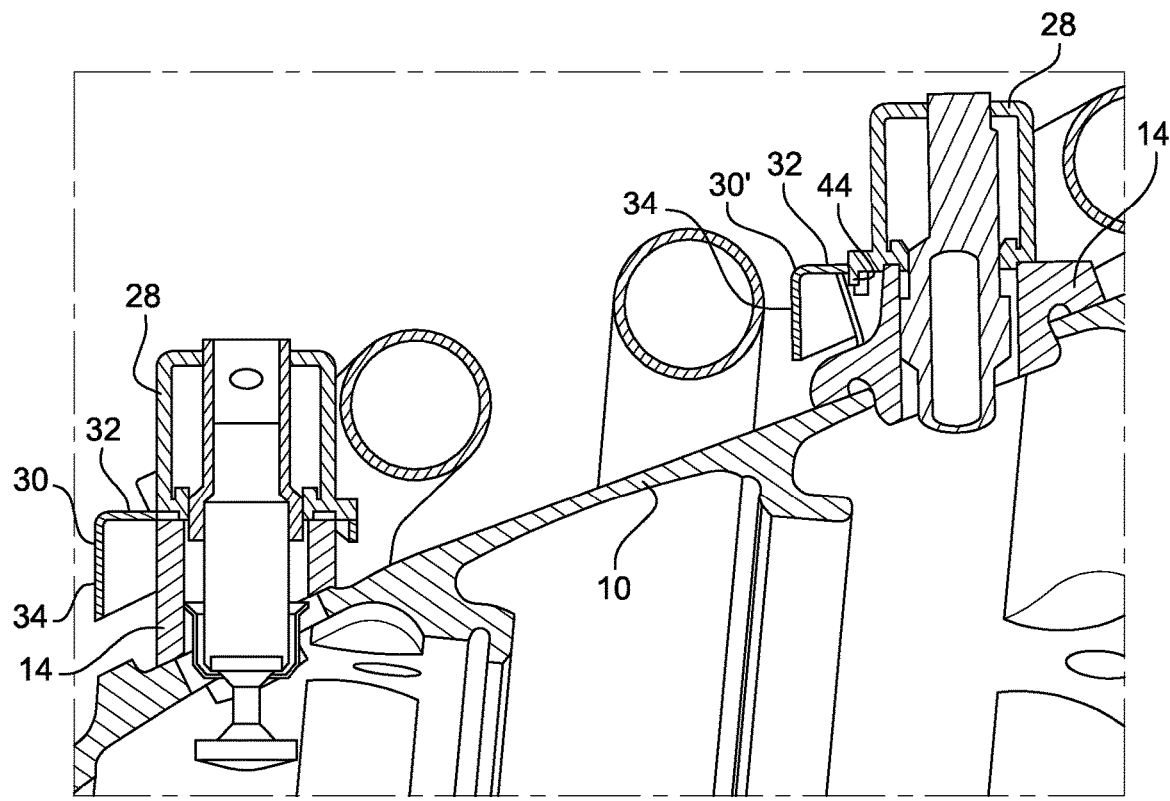
Fig. 6

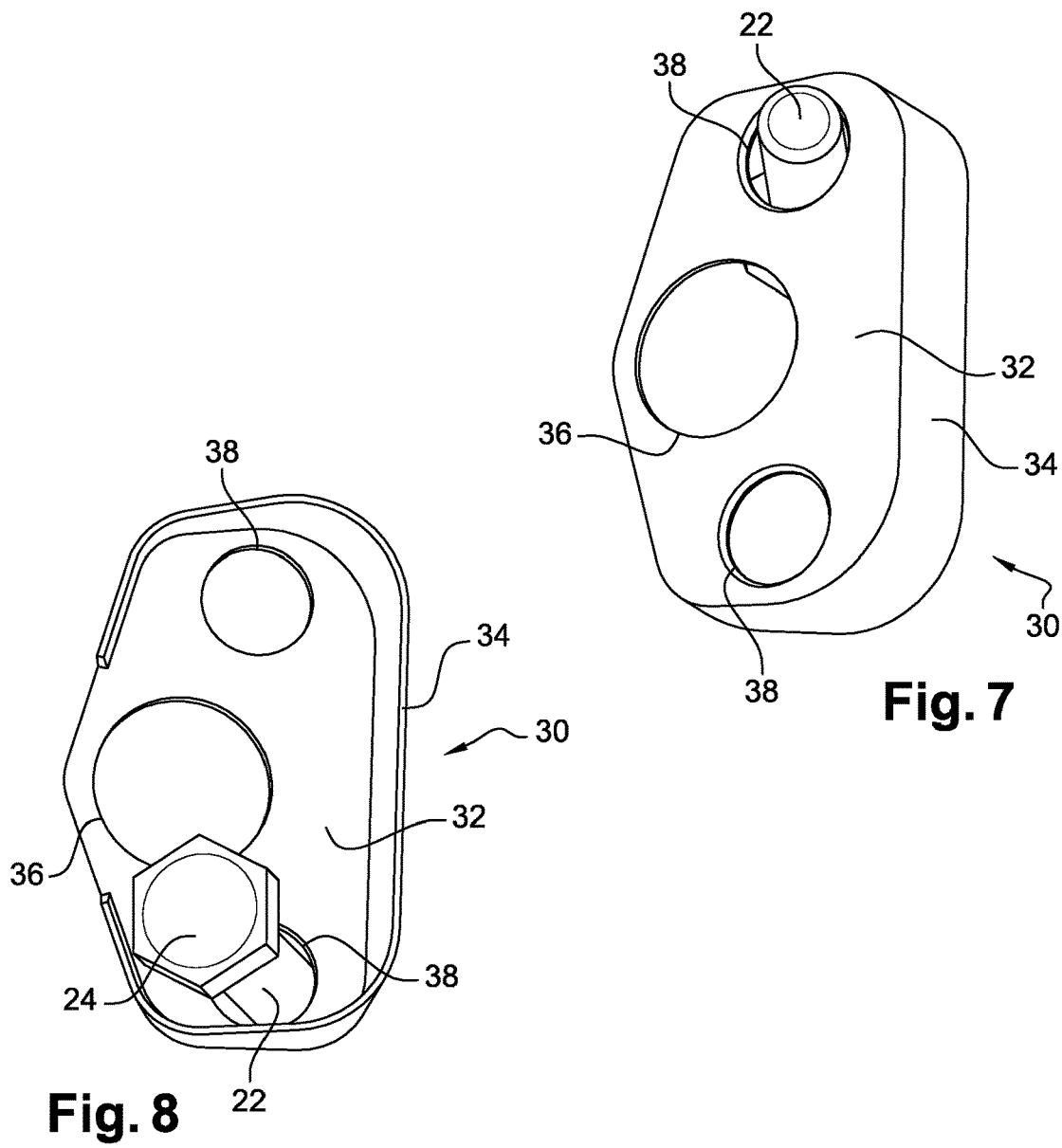
Fig. 7
Fig. 8
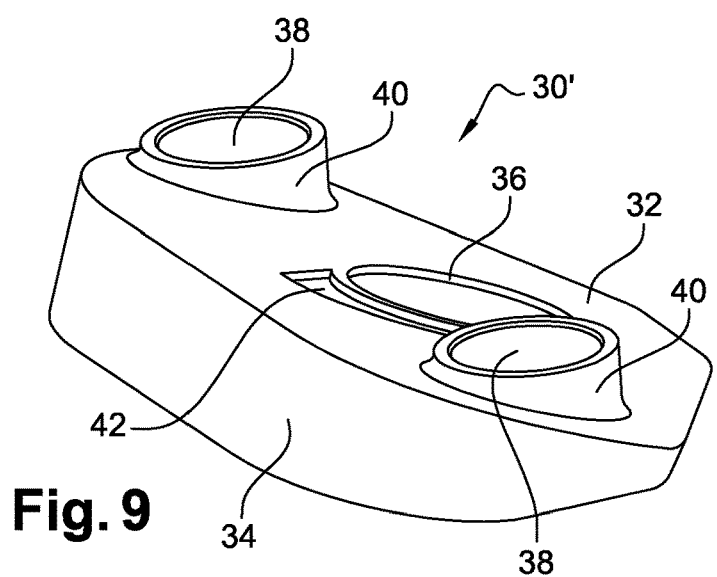
Fig. 9

TURBOMACHINE CASING COMPRISING AN ENDOSCOPY PORT

TECHNICAL FIELD

The present invention relates to a turbine engine casing comprising an endoscopy opening.

PRIOR ART

The prior art includes namely document EP-A1-2 407 643.

An endoscopy opening in a turbine engine casing is generally formed in a boss on said casing. In a particular embodiment, said boss is formed by a member which is positioned on and fixed to the casing, said member comprising an internal chute which communicates with the opening in the casing so that an endoscope can pass through.

In the current art, the member is fixed to the casing using means of the screw and nut type. The member comprises two openings for mounting screws, the heads of which bear against an inner surface of the casing and receive nuts which are intended to bear against the member in order to press it against the casing.

The chute of the member comprises an internal thread for screwing in a sealing plug which is intended to be removed by an operator prior to passing an endoscope through the chute and prior to an inspection operation.

During said inspection operations, it has been noted that an operator may mistakenly unscrew the nuts of the means for fixing the member, when only the endoscopy plug should be unscrewed. This error may lead to losing the nuts in the engine, which would require the engine to be removed.

It has already been proposed to solve this problem by producing two welding points between each nut and the corresponding screw. However, this solution has not proven very effective because an attempt by an operator to loosen the nut could lead to the screw breaking and would thus also require the engine to be removed.

The aim of the present invention is in particular to provide a simple, effective and economical solution to the above-mentioned problem.

SUMMARY OF THE INVENTION

The invention proposes a turbine engine casing comprising an endoscopy opening and a member which is positioned on and fixed to the casing and comprising a chute which communicates with the opening, and means for fixing the member to the casing, characterised in that it further comprises a plug for screwing into the casing opening which comprises an internal thread, and a cowl which is mounted on the member and covers the fixing means at least in part, the cowl being arranged so as to allow free access to the chute when the plug is not screwed into said chute, and in that said plug comprises means for bearing against the cowl so as to keep it pressed against the member.

The fixing means can be of any type and for example of the screw and nut type, of the rivet type, etc., the cowl being intended to impede or even prevent said means from being taken using a tool.

The cowl thus forms a cover which limits access to the fixing means by a tool, such as a tightening/loosening wrench. An operator thus cannot mistakenly unscrew the fixing means during an endoscopy inspection operation. The invention thus makes it possible to prevent the means for fixing the member to the casing from being accidentally dismantled. Furthermore, the cowl does not impede access to the chute and thus allows an endoscope to pass through the chute and the endoscopy opening in the casing.

The member can define a boss on the casing. In the assembled position, the member can comprise a planar outer surface which is substantially parallel to an axis of revolution of the casing when said casing is annular. Said surface can be tangent to a circumference which is centred on said axis.

The cowl preferably comprises an opening which is aligned with the chute and is designed so that the plug can be screwed into the chute by passing through said opening.

The plug thus ensures that the cowl is held on the member. The cowl can be held so that it bears against the above-mentioned outer surface of the member.

The cowl can comprise a peripheral rim extending around the member. Said rim can engage with the member by abutment so as to limit the movements of the cowl with respect to the member.

The cowl can comprise at least one opening for mounting a screw or a threaded rod of the fixing means. It can comprise two or more openings of this type.

The cowl can be made of metal sheeting.

The casing can comprise at least two endoscopy openings, at least two members which are positioned and fixed in the region of said openings, and at least two cowls which are mounted on said members, the cowls having shapes which are the same or different.

Advantageously, the cowl comprises at least one indexing and/or anti-rotation means which is designed to cooperate with a complementary means of a plug and/or of an endoscopy and/or liquid penetrant testing system.

The present invention also relates to a turbine engine, such as a turbojet engine or a turboprop engine of an aeroplane, characterised in that it comprises at least one casing such as described above.

The invention also relates to a cowl for a casing such as described above, characterised in that it comprises a first opening which is designed to be passed through by an endoscopy plug, and at least one second opening which is designed to be passed through by a screw or a threaded rod but not by the head of said screw or by the nut which is intended to be screwed onto the screw or the threaded rod.

The invention also relates to an assembly comprising a cowl of this type and at least one screw or threaded rod which passes through said at least one second opening in the cowl, said opening having a diameter which is less than the outer diameter of the head of said screw or of the nut which is intended to be screwed onto the screw or the threaded rod.

The cowl can comprise at least one indexing and/or anti-rotation means which is designed to cooperate with a complementary means of a plug and/or of an endoscopy and/or liquid penetrant testing system.

The present invention also relates to a method for carrying out an endoscopy and/or liquid penetrant testing through an endoscopy opening in a casing according to any of claims 1 to 9, characterised in that it comprises steps consisting in:

a) unscrewing the plug and removing it from the member which is fixed to the casing, and b) introducing an endoscopy and/or liquid penetrant testing system into the chute of the member and into the opening in the casing, the cowl remaining mounted on the member during steps a) and b).

When the cowl comprises an opening which is aligned with the chute and is designed so that the plug can be screwed into the chute through said opening, step b) can consist in introducing the endoscopy and/or liquid penetrant testing system into the opening in the cowl, the chute of the member, and the opening in the casing.

When the cowl comprises at least one opening for mounting a screw or a threaded rod of the means for fixing the member, the method can comprise, before step b), and even before step a), an additional step consisting in positioning on said screw or threaded rod an element for locking the cowl.

When the cowl comprises at least one indexing and/or anti-rotation means and the system comprises at least one means which is complementary to said indexing means, the method can comprise, during step b), a sub-step consisting in making the indexing means of the cowl and the means which is complementary to the system cooperate in order in particular to determine a reference position of the system with respect to the casing.

DESCRIPTION OF THE DRAWINGS

The invention will be better understood, and other details, features and advantages of the invention will become apparent upon reading the following description, given by way of non-limiting example with reference to the accompanying drawings, in which:

FIGS. 4 and 5 are schematic perspective views of a turbine engine casing which is equipped with cowls according to the invention;

FIG. 6 is a schematic perspective axial sectional view along the longitudinal axis of the casing, of the members, the plugs and the cowls from FIG. 5;

FIGS. 7 and 8 are schematic perspective views of a cowl according to the invention, seen from above and below respectively;

FIG. 9 is a schematic perspective view of a variant of the cowl according to the invention, seen from the side.

DETAILED DESCRIPTION

Figure 1:
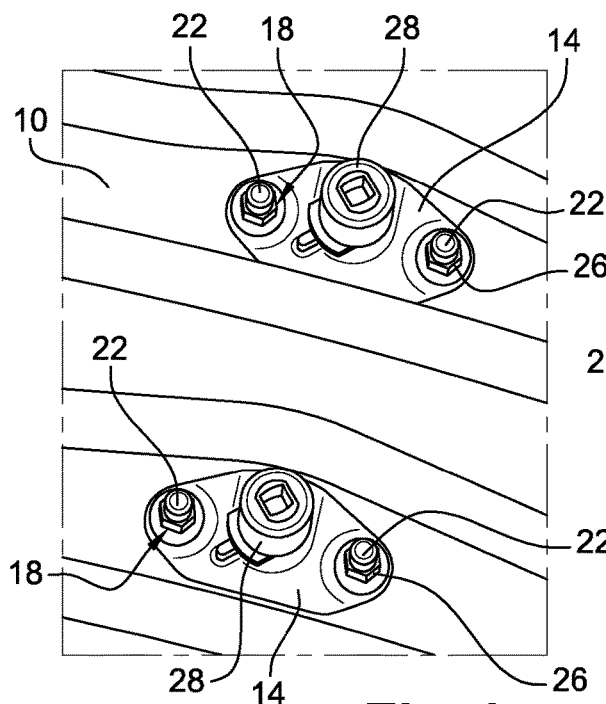
FIG. 1 is a schematic perspective view of a turbine engine casing which is equipped with members and endoscopy plugs.
Figure 2:
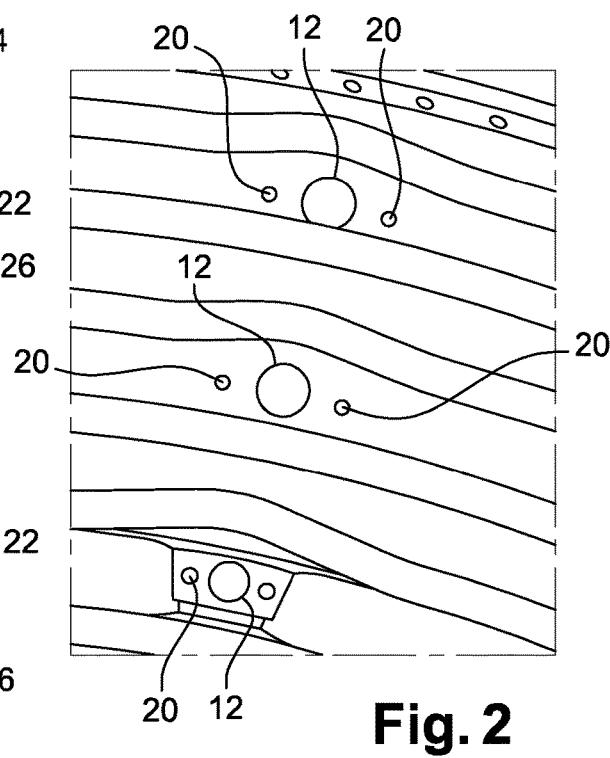
FIG. 2 is a schematic perspective view of the casing from FIG. 1, without the endoscopy plugs and the members for mounting said plugs.
Figure 3:
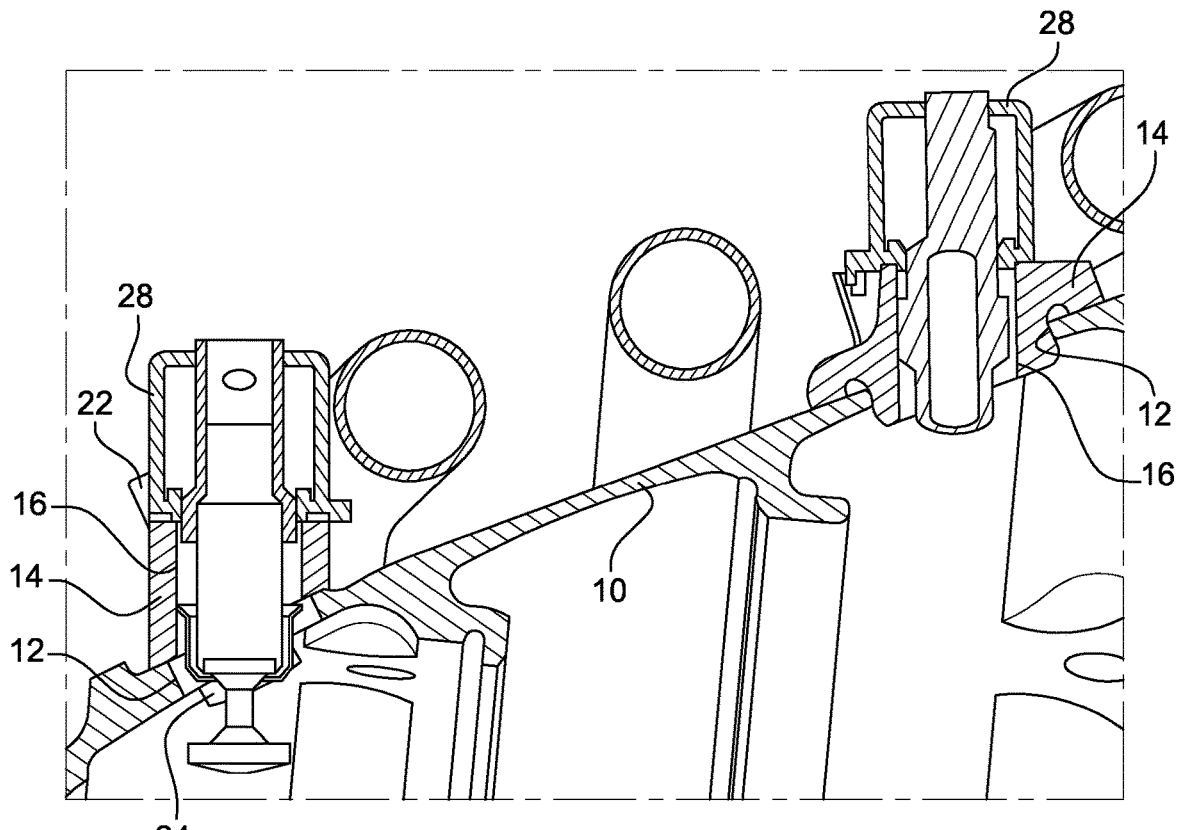
FIG. 3 is a schematic perspective axial sectional view along the longitudinal axis of the casing, of the members and the endoscopy plugs from FIG. 1.

Reference is firstly made to FIGS. 1 to 3, which show the art prior to the invention. A turbine engine, such as a turbojet engine or a turboprop engine of an aeroplane, comprises casings comprising endoscopy openings, i.e. openings through which an endoscope can be passed to inspect parts inside the casing during an inspection operation which can be carried out on an engine which is attached to the wing of the aeroplane.

In the drawings, the casing 10 comprises three endoscopy openings 12 which are at a distance from one another along a longitudinal axis of the casing, which has a generally annular shape. Said openings 12 are formed in a relatively thin portion of the casing 10.

A member 14 is positioned on and fixed to the casing, in the region of each opening 12, so as to define a boss projecting on the outer surface of the casing. Said member 14 comprises a central chute 16 which is intended to communicate with the corresponding opening 12 and lateral openings 18 which are aligned with openings 20 in the casing and which are used for mounting means of the screw and nut type for fixing the member 14 to the casing 10.

Each fixing means comprises a screw 22 which is inserted into an opening 20 in the casing and into the corresponding opening 18 in the member 14, and the head 24 of which screw bears against the inner surface of the casing. Each screw receives a nut 26 which is screwed from outside and which is intended to bear against the member 14.

The chute 16 comprises an internal thread for screwing in a plug 28 to seal the chute.

The present invention proposes solving the problem set out above by means of a cowl which is intended to be mounted on each member and to cover the nut 26 at least in part in order to limit or even prevent access thereto by a tool.

FIGS. 4 to 9 show an embodiment of the invention in which two particular forms of the cowl are shown. A casing 10 can comprise a number of cowls 30, 30' which is equal to the number of members 14 of said casing. In the example in FIGS. 1 to 3, the casing can thus be equipped with three cowls (only two of which are shown in FIGS. 4 to 6). Furthermore, because the shapes and dimensions of the members 14 can differ from one member to another according in particular to the position of said members on the casing, the cowls according to the invention which equip the same casing can be different or the same. In the example shown, the casing 10 is equipped with two types of cowls 30, 30', the first type 30 being shown in FIGS. 7 and 8 and the second type 30' being shown in FIG. 9.

Each cowl 30, 30' comprises a relatively planar wall 32 which is intended to cover the member 14, and a peripheral rim 34 extending from the side of the casing 10 which is intended to extend over substantially the entire periphery of the member, for example at a distance therefrom.

The wall 32 of each cowl 30, 30' comprises a central opening 36 which is aligned with the chute 16 of the member and has an inner diameter which is substantially equal or slightly greater than that of the chute. The wall 32 further comprises two lateral openings 38 for mounting the threaded rods of the screws 22.

As can be seen in FIGS. 7 and 8, each opening 38 has a diameter which is greater than the outer diameter of the threaded rod of the screw 22 and less than that of the nut 26, in such a way that said nut is not accessible through said opening and cannot be unscrewed through said opening.

In the assembled position shown in FIG. 4, each cowl 30, 30' bears against an outer peripheral rim of the chute 16 of the corresponding member and the wall 32 thereof extends in a plane which extends above the nuts 26 which are screwed onto the screws 22. Said nuts are thus not visible in FIG. 4.

The plug 28 is screwed into the chute 16 of the member 14 in the same manner as in the prior art. The plug 28 in this case is intended to be screwed into the chute 16 through the opening 36 in the cowl 30, 30' and to bear against the peripheral edge of said opening to keep the cowl bearing against the above-mentioned rim of the chute. The cowl 30, 30' is thus clamped between the plug 28 and the member 14 when the plug is tightened, which is sufficient to ensure that it is held on the casing. As can be seen in FIG. 6, the plug 28 can comprise an assembly of a plurality of parts.

As can be seen in FIG. 9, each opening 38 in the cowl 30' is defined by a chute 40 for mounting the threaded rod of a screw 22. The chutes 40 of the cowl 30' can be used to guide and mount the cowl and prevent poor positioning of the cowl.

The wall 32 of the cowl 30' in FIG. 9 further comprises a curved aperture 42 extending around and in the vicinity of the opening 36. Said aperture is intended to receive a lug 44 of the plug 28 (FIG. 6).

The aperture 42 can be considered to have a dual function. First and foremost, said aperture receives the lug 44 of the plug 28, which can then engage with a shape made in the boss of the casing to lock the plug in rotation. It can also have an indexing function. According to the position of the aperture 42 around the opening 36, said aperture can make it possible to position the plug 28 in a defined position, for example for optimal clamping.

Figure 10:
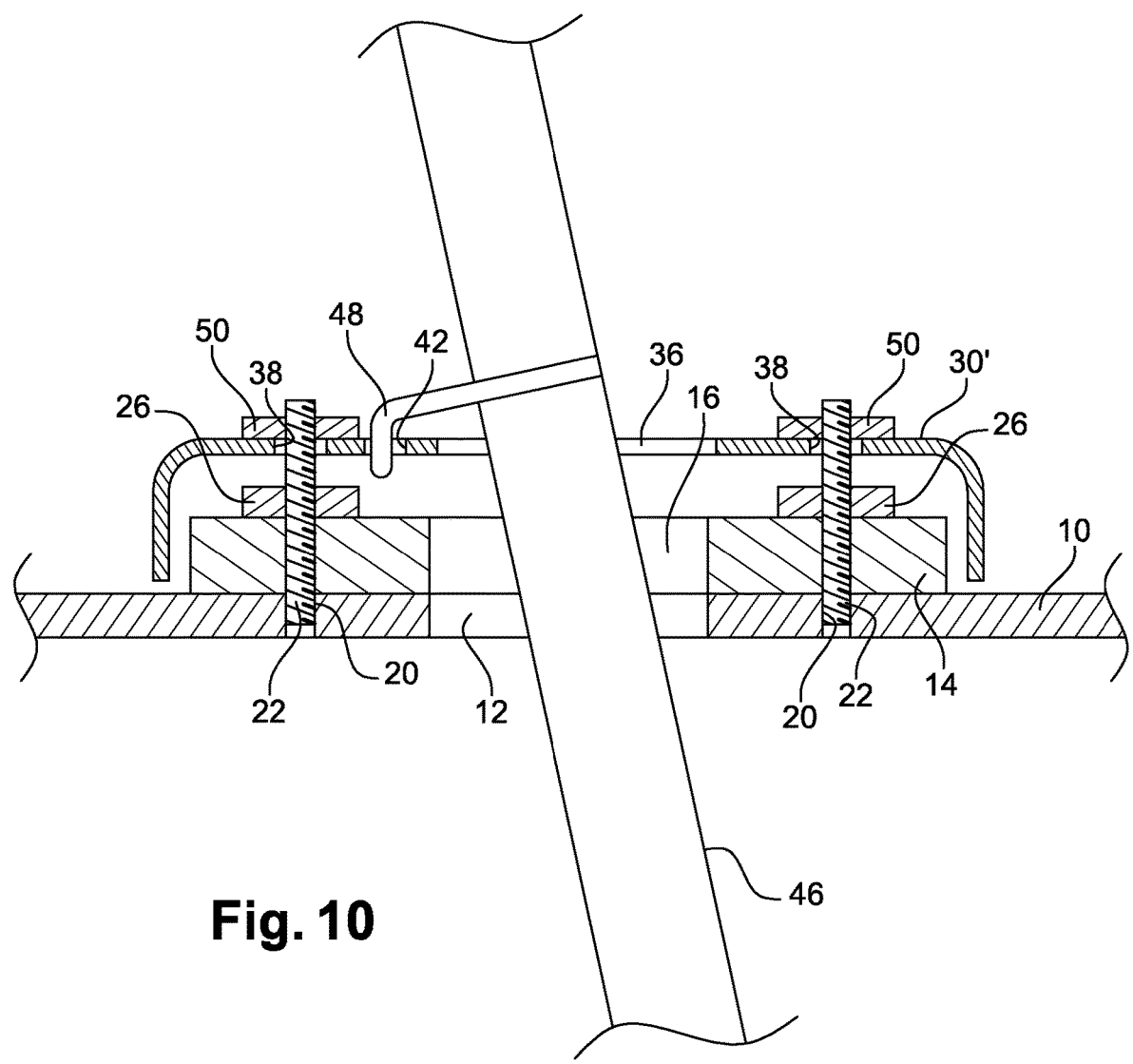
FIG. 10 is a schematic axial sectional view of an endoscopy opening in a casing and shows a method for carrying out an endoscopy and/or liquid penetrant testing according to the invention.

Advantageously, as is shown schematically in FIG. 10, the aperture 42 may further be used as an indexing means for an endoscopy and/or liquid penetrant testing system 46 which is inserted into the opening 12 in the casing 10 (through the opening 36 in the cowl 14 and the chute 16 of the member 14). The system 46 thus carries a complementary means 48 which is designed to cooperate with the indexing means 42 of the cowl 30'. As in the example shown, it can be a finger which is carried by the system 46 and is intended to be inserted into the aperture 42 in the cowl 30'. This is particularly advantageous because it makes it possible to define a reference position of the system 46 with respect to the casing 10 and thus to facilitate in particular locating the region observed in the engine during a maintenance operation. This is the case in particular when the aperture 42 has a predetermined position on the cowl 30', it is thus easy to precisely deduce the position of the system 46 inserted into the endoscopy opening 12.

Before inserting the system 46 into the opening 36 in the cowl 14, the chute 16 of the member 14, and the opening 12 in the casing 10, it is necessary to remove the plug which is screwed into the chute. It is the plug which ensures that the cowl 30' is held on and fixed to the casing 10, as described above. After the plug has been removed, the cowl 30' is thus mounted in a floating manner on the casing, as a result in particular of the play between the openings 38 in the cowl and the threaded rods 22 passing through said openings. However, to prevent movements of the cowl 30' during an inspection, the invention further proposes fixing said cowl using locking elements 50 which in this case are positioned on the free ends of the threaded rods 22 and which are intended in this case to bear against the cowl 30' so as to hold it against the member 14 for example. Said locking elements 50 are for example nuts or washers made of a flexible material such as rubber.

The invention claimed is:

1. A turbine engine casing comprising an endoscopy opening and a member which is positioned on and fixed to the casing and comprising a chute which communicates with the endoscopy opening, and means for fixing the member to the casing, wherein said casing further comprises a plug for screwing into the endoscopy opening which comprises an internal thread, and a cowl which is mounted on the member and covers the fixing means at least in part, the cowl being arranged so as to allow free access to the chute when the plug is not screwed into said chute, said plug for bearing against the cowl so as to keep the cowl pressed against the member.

2. The casing according to claim 1, wherein the fixing means are of the screw and nut type, the cowl being intended to impede or even prevent said means from being taken using a tool.

3. The casing according to claim 1, wherein the cowl comprises an opening which is aligned with the chute and is designed in such a manner than the plug can be screwed into the chute through said opening.

4. The casing according to claim 1, wherein the cowl comprises a peripheral rim extending around the member.

5. The casing according to claim 1, wherein the cowl comprises at least one opening for mounting a screw or a threaded rod of the fixing means.

6. The casing according to claim 1, wherein the cowl is made of metal sheeting.

7. The casing according to claim 1, wherein said casing comprises at least two endoscopy openings, at least two members which are positioned and fixed in the region of said endoscopy openings, and at least two cowls which are mounted on said members, the cowls having shapes which are the same or different.

8. The casing according to claim 1, wherein the cowl comprises at least one indexing and/or anti-rotation means which is designed to cooperate with a complementary means of a plug and/or of an endoscopy and/or liquid penetrant testing system.

9. A turbine engine of an aeroplane, which comprises at least one casing according to claim 1.

10. A turbine engine comprising a casing according to claim 1, wherein the cowl further comprises a first opening which is designed to be passed through by an endoscopy plug, and at least one second opening which is designed to be passed through by a screw or a threaded rod but not by the head of said screw or by the nut which is intended to be screwed onto the screw or the threaded rod.

11. The turbine engine according to claim 10, wherein the cowl further comprises at least one indexing and/or anti-rotation means which is designed to cooperate with a complementary means of a plug and/or of an endoscopy and/or liquid penetrant testing system.

12. A method for carrying out an endoscopy and/or liquid penetrant testing through an endoscopy opening in a casing according to claim 1, which comprises:
a) unscrewing the plug and removing it from the member which is fixed to the casing, and
b) introducing an endoscopy and/or liquid penetrant testing system into the chute of the member and into the opening in the casing,
the cowl remaining mounted on the member during steps a) and b).

13. The method according to claim 12, wherein the cowl comprises at least one opening for mounting a screw or a threaded rod of the means for fixing the member, said method comprises, before step b), or before step a), positioning on said screw or threaded rod an element for locking the cowl.

14. The method according to either claim 12, wherein, the cowl comprising at least one indexing and/or anti-rotation means and said system comprising at least one means which is complementary to said indexing means, said method comprises, during step b), a sub-step of making the indexing means of the cowl and the means which is complementary to the system cooperate in order to determine a reference position of the system with respect to the casing.

\* \* \* \* \*